United States Patent [19]

Shchetanov et al.

[11] Patent Number: 5,556,586
[45] Date of Patent: Sep. 17, 1996

[54] PROCESS FOR MANUFACTURING A HEAT INSULATING MATERIAL

[75] Inventors: Boris V. Shchetanov; Galina T. Mizyurina; Vladimir N. Gribkov; Radii E. Shalin; Evgueni B. Kachanov, all of Moscow, U.S.S.R.

[73] Assignees: Aerospatiale Societe Nationale Industrielle, France; VIAM-All Russian Institut of Aviation Materials, U.S.S.R.

[21] Appl. No.: 404,917

[22] Filed: Mar. 16, 1995

[30] Foreign Application Priority Data

Mar. 16, 1994 [FR] France ................................ 94 03047

[51] Int. Cl.⁶ ................................................. C04B 41/45
[52] U.S. Cl. ................................................. 264/62
[58] Field of Search ................................. 264/60, 62, 87; 427/294, 314, 397.7, 443.2

[56] References Cited

U.S. PATENT DOCUMENTS 4,735,757  4/1988  Yamamoto et al. ................... 264/119

FOREIGN PATENT DOCUMENTS

| 0361356 | 4/1990 | European Pat. Off. . |
| 2337704 | 8/1977 | France . |
| 2610923 | 4/1988 | France . |
| 2168284 | 6/1986 | United Kingdom . |

*Primary Examiner*—Christopher A. Fiorilla
*Attorney, Agent, or Firm*—Burns, Doane, Swecker, Mathis

[57] ABSTRACT

A process for manufacturing a heat insulating material including alumina based fibers and aluminosilicate binder. The process includes the steps of: (a) milling alumina based fibers, having a mean diameter less than or equal to 2 μm, in water until a mean aspect ratio (l/d) of 30 to 130 is obtained; (b) vacuum molding a billet from the resulting aqueous, fibrous, flowing slurry; (c) fixing the billet in a frame, while compressing it slightly; (d) drying the slightly compressed billet in the frame to form a dried billet; (e) preparing an aluminosilicate binder having low durability; (f) impregnating the dried billet, fixed in the frame, with the binder; (g) gelling the binder to produce a semi-finished product; (h) removing the semi-finished product from the frame; (i) drying the semi-finished product; and (j) firing the semi-finished product.

11 Claims, No Drawings

PROCESS FOR MANUFACTURING A HEAT INSULATING MATERIAL

FIELD OF THE INVENTION

The present invention relates to heat insulation at high temperatures, i.e. at temperatures in the order of 1600° C.

More precisely, the invention relates to an alumina fiber based heat insulating material which can be used at an operating or service temperature in the order of 1600° C. over a long period. This material possesses improved physicochemical and thermophysical properties such as strength, weight, thermal conductivity and operating temperature.

BACKGROUND OF THE INVENTION

Certain alumina fiber based heat insulating materials are well known. Such materials have a composition resulting from the mixing of alumina fibers and of silica fibers, or from the mixing of three types of fibers: alumina, aluminoborosilicate and silica. These materials are manufactured in a V-blender from an aqueous suspension of fibers, with subsequent drying and firing. Materials of this type cannot be used for a long period of time at a temperature in the region of 1600° C. because silica fibers which are not sufficiently heat resistant are present in the composition. In addition, the composition contains boron oxide, which is introduced therein to obtain a better sintering and to prevent the formation of α-cristobalite. The maximum temperature, for a prolonged operating or service life, is 1430° C. in the case of these materials.

European patent application No. 0 093 656 discloses a heat insulating material based on fibers of alumina, carbon and other refractory materials. Different organic resins are used for binding the fibers. A molded fibrous billet is impregnated with the resin and is subjected to pyrolysis in an inert atmosphere at a temperature of 700° to 2700° C. This material also cannot be used at high temperature because the binder is a product of the pyrolsis of organic resins. Consequently, the material has a tendency to oxidize in air, at temperatures of 900° to 1100° C. As indicated in the aforementioned patent application, the resulting material is capable of withstanding only 1000° C. for 12 hours and a thermal shock of up to 3000° C. This material has a density of 200 kg/m³ (0.2 g/cm³) and a bending strength of 4 MPa (40 kgf/cm²).

A strong, lightweight heat insulating material is described in French patent application No. 2 669 623. The bulky parts of intricate configurations are made by weaving the skeleton from carbon fibers pre-treated with a first binder, and then this skeleton is rigidified by means of a second binder and subjected to heat treatment. The heat resistance of this material is the same as for the material described in the aforementioned European patent application. As the binders used in the invention described are carbon precursors, the service temperature cannot exceed 1000° C., for the same reasons as given above.

Ceramic and/or alumina fiber based materials having densities in the range of 144 to 1100 kg/m³ (0.144 to 1.1 g/cm³) are well known from U.S. Pat. Nos. 4,041,199, 4,349,637 and 5,071,798; German patent applications 27 00374, 33 15880, 34 44397 and 38 05110; British patents 1 433 923 and 1 506 152; British patent applications 2 052 472 and 2 089 782; and European patent applications 0 010 385 and 0 371 586. These materials are proposed for use as high temperature insulation (in general as furnace linings) at temperatures ranging from 1400° to 1800° C. In practice, the composition of each of the above materials includes refractory fibers or materials (alumina, silica powder or a mixture of oxide powders), refractory binder (colloidal alumina and/or colloidal silica, or precursors of these oxides, or their mixtures and more complex compositions), thickeners, stabilizers, activators and other processing aids.

Processes for manufacturing articles (plates and more complex parts) differ from one another but include common steps: molding an aqueous suspension of fibers, introducing a binder, subsequent drying and firing of the fibrous billet obtained. The binder is introduced either directly into the suspension, or by impregnating the green fibrous billet, or both processes are used if the binder is complex and if it is desirable to introduce the ingredients of the binder in succession.

Molding is carried out using a vacuum process, under pressure, by casting or using a combination of different processes, for example casting with simultaneous vibrations, etc.

The resulting material has a ratio of fibers to binder (or to other fillers) extending over a very wide range. The ratio of the fibers withstanding the highest temperatures ["Saffil®" made by the LOI company (Great Britain), "Fibermax®" made by the Carborundum Resistant Materials company (USA), "Denka Alken®" made by Denki Kagaku Kogyo K.K. (Japan)] to the less heat resistant ceramic fibers ["Fiberfrax®" made by Carborundum Resistant materials (USA), "Triton Kaowool®" made by Marganit Ceramik Fiber (Great Britain), etc. . .] also extends over a very wide range. It is obvious that the higher the "high temperature" fiber content of the material, the higher is its heat resistance.

The highly heat resistant fibers "Saffil®", "Fibermax®" and "Denka Alken®" have a mean diameter of 3 μm, a strength of 500 to 1000 MPa (50 to 100 kgf/mm²), a maximum operating temperature of 1500° to 1700° C., that is to say a classification temperature of 1500° to 1700° C., and the following composition (in weight %):

| | |
|---|---|
| "Saffil ®": | 96 $Al_2O_3$, 4 $SiO_2$; |
| "Denka Alken ®": | 80 $Al_2O_3$, 20 $SiO_2$; |
| "Fibermax ®": | 72 $Al_2O_3$, 28 $SiO_2$ (mullite composition). |

In U.S. Pat. No. 5,071,798 and in German patent application (DE-OS)38 05110, there is disclosed a material having a service temperature of 1600° to 1800° C. This material is formed by placing in an aqueous suspension a mixture comprising highly heat resistant $Al_2O_3$ fibers having a mean diameter of 3 μm and aluminoborosilicate fibers, $Al_2O_3$ and/or $SiO_2$ powder, a binder constituted by colloidal $Al_2O_3$ and/or $SiO_2$ and aluminum sulfate. The proportions of the components are selected such that, after firing, which is carried out at a temperature of 1400° to 1600° C., the composition consists solely of mullite (over 12 weight %) and of corundum. For different reasons, for example owing to the placing of the powder in an aqueous suspension without any thickener, the process which is disclosed in the aforementioned documents does not make it possible to obtain a uniform material having a density of less than 500 kg/m³ (0.5 g/cm³), the reason for this being the precipitation of the powder on the lower surface of the plate under the effect of gravity. In addition, the need to carry out the firing step at high temperatures leads to grain growth and, consequently, the strength of the fiber decreases. It appears that, even when the material is of rather high density, [810 kg/m³ (0.81 g/cm³)], its maximum bending strength is only 10.2 MPa (102 kgf/cm²).

There is known a material having a bending strength of 0.3 MPa (3 kgf/cm²), whereas its density is 250 kg/m³ (0.25 g/cm³) (see British patent 2 089 782). This material is intended for a service temperature of 1600° C. and exhibits 3% linear shrinkage after 3 hours at 1600° C.

As a thickener, use is made of carboxymethylcellulose or polyethylene oxide which also acts as a dispersant to produce a uniform slurry.

Cation starch is widely used as a thickener (see GB patent 1 506 152 and German patent applications 27 00374 and 34 44397).

The ceramic fiber based material having thermal resistance of up to 1260° C. (i.e. fibers that are well sintered at low temperatures) has maximum strength. The thermal resistance of these fibers thus also defines the thermal resistance of the material.

When "high temperature" fibers are used, it is necessary to provide more thermally resistant binder which, in turn, leads to higher temperature sintering. This sintering temperature is sometimes higher than the service temperature of the material, but, in such a case, the strength of the fiber is reduced because of the grain growth.

Increasing the density of the material is the alternative way of obtaining a strong material.

To obtain a strong, lightweight composition, researchers use different methods of introducing the binder. In addition, binder composition vary over a wide range for the purpose of obtaining a sintering temperature that is at least not higher than the service temperature of the material.

As disclosed in U.S. Pat. No. 4,041,199, colloidal silica ($SiO_2$) is introduced into an aqueous powder-fiber mixture, in parallel with starch. In addition, aluminum powder and aluminum sulfate are also added (in the amount of 1 weight %, based on the total weight of all the components in the resulting material), in order to reduce the density of the product.

GB patent 2 052 472 discloses a process that comprises wetting a fibrous mat with an aqueous monoaluminum phosphate solution.

German patent application (DE-OS) 33 15880 teaches a process according to which an aluminum hydroxide gel and/or an aluminum salt solution are placed in an aqueous fiber slurry, at the same time as a solution of monoaluminum phosphate. The manufactured article is obtained by vacuum molding with additional drying.

A refractory binder composition is suggested in aforementioned U.S. Pat. No. 4,349,637. The binder includes alumina ($Al_2O_3$) or other complex compounds containing aluminum which are transformed into $Al_2O_3$ during drying and firing.

Above-mentioned European patent application 0 371 586 discloses the introduction of an organic binder (polyvinyl alcohol, polyethylene oxide, etc.) into a non-organic binder (colloidal $Al_2O_3$, $SiO_2$, $ZrO_2$, and their mixtures).

From aforementioned GB patent 1 433 923 is known a binder comprising a sol formed of colloidal particles having a dense silica core and a colloidal amorphous alumina coating.

Although the aforementioned processes are advantageous, "high temperature" fiber based lightweight materials [having a density of 100 to 500 kg/m³ (0.1 to 0.5 g/cm³)], which materials are acceptable for long term service at 1600° C., have low strength.

Thus, the maximum bending strength of the material having a density of 250 kg/m³ (0.25 g/cm³) is 0.3 MPa (3 kgf/cm²) (see GB patent application 2 089 782) and the maximum bending strength of the material having a density of 520 kg/m³ (0.52 g/cm³) is 4.2 MPa (42 kgf/cm²) [see German patent application (DE-OS) 34 44397].

SUMMARY OF THE INVENTION

The main object of the present invention is to obtain a strong, lightweight fibrous heat insulating material having a service temperature in the region of 1600° C.

Another object of the present invention is to obtain a lightweight heat insulating material capable of serving at high temperatures, the said material having, at the same time, low thermal conductivity.

These objects are achieved by the present invention, which provides a heat insulating material offering the properties sought, as well as a process for manufacturing the same.

More precisely, according to one of its aspects, the present invention relates to a heat insulating material in the form of a porous, anisotropic body made of alumina based fibers and an aluminosilicate binder, characterized in that:

a) it contains from 70 to 90 weight % of alumina based fibers and from 10 to 30 weight % of aluminosilicate binder, the said fibers being composed of 72 to 97 weight % of $Al_2O_3$ and 3 to 28 weight % of $SiO_2$ and having a mean diameter less than or equal to 2 μm, a mean aspect ratio (l/d) of 30 to 130, preferably from 40 to 90, a strength of at least 600 MPa and a classification temperature of 1650° C.;

b) it has a density in the range of 150 to 500 kg/m³ (0.15 to 0.5 g/cm³);

c) its linear shrinkage, after 24 hours at 1600° C., is not greater than 2% in its "strong" direction and not greater than 4% in its "weak" direction;

d) in its "weak" direction, its tensile strength is at least 0.15 MPa and its compression strength is at least 0.2 MPa;

e) it has an anisotropy of 1.3 to 4; and f) it has a service temperature of 1600° C. over a long period.

Preferably, the alumina based fibers have a diameter in the range of 0.1 to 5 μm, predominantly from 1 to 3 μm, and a length in the range of 5 to 600 μm, predominantly from 20 to 300 μm.

In one preferred embodiment, the material developed according to the present invention is of the following composition: 65 to 97 weight % of $Al_2O_3$ and 3 to 35 weight % of $SiO_2$, preferably from 75 to 85 weight % of $Al_2O_3$ and from 15 to 25 weight % of $SiO_2$.

Preferably, the material according to the present invention has a crystalline structure with a grain size of from 0.01 to 0.5 μm, predominantly from 0.1 to 0.3 μm.

In another preferred embodiment, when the material has a density of 250±30 kg/m³ (0.25±0.03 g/cm³), its thermal conductivity is less than 0.35 W/m.K in its "weak" direction, at 1600° C. and at a pressure of 0.1 MPa (1 atm).

According to another of its aspects, the present invention relates to a process for manufacturing the heat insulating material, defined hereabove, from alumina based fibers and aluminosilicate binder, characterized in that it includes the following steps:

a) milling alumina based fibers, having the required composition and a mean diameter less than or equal to 2 μm, in water until a mean aspect ratio (l/d) of 30 to 130, preferably 40 to 90, is obtained;

b) vacuum molding a billet from the resulting aqueous, fibrous, flowing slurry and subsequent removal from the mold;

c) fixing the said billet in a frame, while compressing it slightly;

d) drying the said slightly compressed billet in the frame;

e) preparing an aluminosilicate binder having low durability;

f) impregnating the dried billet, fixed in the frame, with the binder;

g) gelling the binder;

h) removing the semi-finished product thus formed from the frame;

i) drying the semi-finished product;

j) firing the semi-finished product.

Preferably, step a) comprises two phases:

a') pre-milling water wetted fibers which have already been placed in the mold, by mechanical pressing using a punch, until the aspect ratio (l/d) is 10 to 20% greater than the required value;

a") milling the fibers in water in a disperser having a propeller mixer with a shifted axis, the said milling being carried out until the required aspect ratio (l/d) is obtained.

Step e) of preparation of the binder is advantageously carried out immediately prior to impregnation.

The binder can be essentially formed of an aqueous mixture of colloidal $SiO_2$ having a pH of at least 8, and of one or more non-organic and/or organic aluminum salts, preferably aluminum nitrate.

The weight ratio of the components in the binder, expressed as oxides, i.e. $SiO_2:Al_2O_3$, ranges from 0.4 to 1.4, preferably from 0.8 to 1.2.

Step f) of impregnating the dried billet with the binder is advantageously carried out by placing the billet, fixed in a frame between two perforated plates, in a bath containing the binder.

Step g) of gelling the binder is advantageously carried out at ambient temperature, holding the impregnated billet in air until the solid state is obtained.

Step i) of drying the semi-finished product is advantageously carried out in air, at a temperature of not more than 100° C., preferably at a temperature of 85° to 95° C., until a constant weight is obtained.

Step j) of firing the semi-finished product is advantageously carried out in air, at a temperature of 1300° to 1600° C., for 1 to 10 hours, preferably for 2 to 5 hours.

The material according to the invention, which essentially consists of alumina based fibers, is at the same time lightweight, mechanically strong and resistant to thermal shocks, and it has a service temperature of 1600° C. over a prolonged period.

To prepare such a material, use is made of alumina based fibers having a mean diameter less than or equal to 2 μm. This choice is made for the following reasons:

with a smaller mean diameter, the number of contacts between the fibers in the material increases and, consequently, the mechanical strength of the latter increases (while all the other characteristics remain the same);

a material made from thinner fibers has lower thermal conductivity, as compared with a material made from thicker fibers.

Consequently, according to one preferred embodiment, the heat insulating material according to the present invention is manufactured as described hereinafter. Alumina based fibers having the aforementioned properties are milled until the required aspect ratio (l/d) is obtained. The milling is carried out in two phases because the fibers are relatively strong or resistant and it is therefore difficult to break them. Consequently, if milling were carried out only in a disperser, the process would take a long time and would be of low productivity. The process is considerably accelerated when milling is carried out in a mold with the help, for example, of a hydraulic press but, in this case, it is difficult to control the aspect ratio (l/d). Consequently, the final fiber milling stage [until the desired aspect ratio (l/d) is obtained] is carried out in distilled water, in a disperser having a propeller mixer with a shifted axis, the said mixer having a rotational speed of 2000 to 3000 r.p.m. Milling is carried out at a fiber concentration of 1 to 5 volume %. The specific value of the concentration is selected according to the density desired for the material. When a uniform, flowing slurry is obtained, milling is finished. Then the suspension is poured into a mold having the dimensions of 200×200×110 mm. At the bottom of the mold are placed a perforated metallic plate and a thin network of meshes or net having a mesh or cell size less than or equal to 0.8 mm. The excess water is drained off, from below, through the effect of a vacuum (the receiver being evacuated in a vacuum of 0.02 to 0.06 MPa) for 2 to 5 minutes. The fibrous billet obtained is removed from the mold, fixed in a frame and pressed perpendicularly to its large plane surfaces, using perforated plates. The gap between the plates is adjusted mechanically; this gap defines the required height of the billet. The billet being in a fixed position, it is air dried at a temperature of between 90° and 250° C., preferably between 120° and 170° C., until the water has been completely removed. Checks are carried out by weighing the billet and drying is completed when a constant weight is obtained. It is necessary to dry the billet until all the water has been removed in order to have a subsequent intimate contact between the binder and the fibers, and to adjust the amount of binder added.

The dried billet is impregnated with the binder, which is prepared immediately prior to the impregnation step.

To prepare the binder, use is made of commercial grade reactants, that is to say $Al(NO_3)_3 \cdot 9H_2O$ (this salt can be produced according to the Russian standard GOST 3557-75) and a solution of colloidal silica (silica sol) having a pH of at least 8 and an $SiO_2$ concentration of 20 to 25 weight % (Russian standard TU 6-09-4989-83).

The total amount of oxides introduced together by the binder into the billet is brought to a value of 10 to 30 weight %.

As a source of aluminum, it is possible to use other non-organic and/or organic salts (aluminum chloride, aluminum acetate, etc.). A solution of salt (s) in which distilled water is a solvent, is firstly prepared, and then the colloidal silica is introduced into this solution of salt(s).

The amount of alumina and the aluminum concentration in the salt, as well as the amount of $SiO_2$ and its concentration in the colloidal solution are selected in such a way that the total quantity of oxides introduced together by the binder into the billet is brought to a value of 10 to 30 weight %, in relation to the final weight of the product and that the $SiO_2:Al_2O_3$ weight ratio is from 0.4 to 1.4, and preferably from 0.8 to 1.2. Such proportions ensure the gelling of the binder, without the addition of one or more thickening type components such as, for example, starch.

The amount of binder prepared is advantageously equal to the volume of the fibrous billet.

When the binder is introduced immediately into the slurry, part of this binder is lost in the water removal step during the molding of the billet. On the other hand, when the binder is introduced by impregnation into the green billet, a large amount of binder does not penetrate into the billet owing to the presence of residual water in the latter.

In the process according to the prevent invention, which enables the specific amount of binder necessary to be supplied, this drawback is overcome. The binder is completely introduced into the dried billet, in the following steps: the binder is poured into the bath vessel and then the billet, which is fixed between two perforated plates made of stainless steel, is placed in the bath and, under the effect of the capillary forces, the binder is completely sucked into the billet.

After complete absorption of the binder, the billet is removed from the bath and is maintained in air, at ambient temperature, for 10 to 40 hours up to the end of the gelling step, which gelling is checked from the solidification of the billet. Then, the thus prepared semi-finished product is removed from the frame and is dried at a temperature of 85° to 95° C. for 20 to 60 hours, until a constant weight is obtained. Such a drying schedule helps to prevent the binder from migrating towards the surface of the billet, thus ensuring uniform distribution of the binder throughout the volume of the material.

The semi-finished product is fired in air, at a temperature of 1300° to 1600° C., for 1 to 10 hours, preferably for 2 to 5 hours.

After minimum machining, the finished material is obtained, which material has been given the shape of a block. This block is weighed and its geometrical dimensions are determined.

After the density of the block has been determined, it it is cut up into samples to be used in studying the properties of the material.

As a general rule, such materials, that is to say materials that are suitable as re-usable heat insulators, have, as a main strength index, their tensile strength in the "weak" direction, i.e. perpendicularly to the molding plane. The mean tensile strength in this direction for the material having a density of approximately 250 kg/m$^3$ (0.25 g/cm$^3$) is from 0.4 to 0.6 MPa (4 to 6 kgf/cm$^2$); for a density of 350 kg/m$^3$ (0.35 g/cm$^3$), this mean tensile strength is from 0.8 to 1.0 MPa (8 to 10 kgf/cm$^2$) and, for a density of 500 kg/m$^3$ (0.5 g/cm$^3$), it is from 2.5 to 3.0 MPa (25 to 30 kgf/cm$^2$).

Mean linear shrinkage is in the range of 1 to 4% in the "weak" direction and of 0 to 2% in the "strong" direction, after 24 hours at 1600° C.

The thermal conductivity of the material, in particular in the range of high temperatures and densities, is equal to or less than that of known materials of the same type.

The heat insulating material according to the present invention can be used for the thermal protection of space vehicles or space cabins, in particular the orbiters of atmosphere re-entry type space shuttles.

The following examples provide a better illustration of the properties of the material according to the present invention and the process for manufacturing the same.

EXAMPLE 1

Production of the fibrous billet:

300 g of alumina based fibers having a mean diameter of 1.8 μm, a mechanical strength of 650 MPa (65 kgf/mm$^2$), a classification temperature of 1650° C. (a temperature that can be withstood for very short periods), a composition of 85 weight % of $Al_2O_3$ and 15 weight % of $SiO_2$, and which were formed from powders having a grain size of 0.02 μm (200 Å), were wetted with distilled water and placed in a mold having a perforated bottom, which mold was placed on a hydraulic press and was compressed using a punch.

When the force applied reached approximately $2.5 \cdot 10^4$ N (2.5 tons), it was maintained for 1 minute, an aspect ratio (l/d) of approximately 90 thus being obtained.

The fibers thus pre-milled were loaded into a disperser filled with 5 l of distilled water, which corresponds to a fiber concentration of approximately 2 volume %. Then the fibers were re-milled using a propeller mixer having a shifted axis, and a rotational speed of 2800 r.p.m, until the fibrous mass had been transformed into a uniform flowing slurry.

When the concentration was as indicated above, the suspension became flowing when the aspect ratio (l/d) was approximately 80, which corresponds to a material density of approximately 200 kg/m$^3$ (0.2 g/cm$^3$). The suspension comprising fibers, which were milled until the desired aspect ratio (l/d) had been obtained, was poured into the same mold with the perforated plate, which mold was evacuated for 2 minutes at vacuum of 0.5 atm (approximately $5.10^4$ Pa).

The fibrous billet was removed from the mold, fixed in a frame and pressed perpendicularly to its large plane surfaces, using perforated plates. The space or gap between the plates, that is to say the height of the billet, was brought to 40 mm and fixed mechanically. The billet being in a fixed position, it was air dried at 150° C. until a constant weight was obtained.

Preparation of the binder:

230 g of commercial grade aluminum nitrate, $Al(NO_3)_3 \cdot 9H_2O$ (Russian standard GOST 3557-75), with an $Al_2O_3$ content of 13.6 weight % were dissolved in 1150 ml of distilled water at ambient temperature. To the solution thus obtained were added, with stirring, 220 g of colloidal silica solution (Russian standard TU 6-09-4989-83) having an $SiO_2$ concentration of 20 weight % and a pH of 10. 1600 g of a mixture occupying a volume of 1490 ml were obtained. To this mixture were added, with stirring, 110 ml of distilled water, and the binder was obtained in an amount equal to the volume of the fibrous billet (1600 cm$^3$).

The $SiO_2:Al_2O_3$ weight ratio in the binder was 1.42; the total amount of oxides was 75 g (20 weight % on the basis of the weight of the material).

Production of the semi-finished product:

The dried fibrous billet, fixed in a frame, was placed in a vessel (the dimensions of which were 215×215×200 mm) with the binder prepared as described above in an amount of 1600 ml.

After the binder had been completely absorbed, the billet was removed from the bath vessel and held in air, at ambient temperature, for 12 hours, until the end of the gelling step, which was checked or verified from the solidification of the binder. Then, the semi-finished product thus prepared was removed from the frame with perforated plates and dried at 90° C. for 24 hours, until a constant weight was obtained.

Firing was carried out at 1400° C. for 2 hours.

After minimum machining to give it a regular geometrical shape, the material, in the form of a plate, had the following dimensions: 190×190×35 mm and a density of 220 kg/m$^3$ (0.22 g/cm$^3$). Then, the plate was cut up into samples for testing.

Table I herebelow gives the results of the thermal conductivity test in the "strong" direction, in an inert atmosphere at 0.1 MPa (1 atm), according to the "radial thermal flow" method.

The results of the mechanical tests and other properties of the material are given in Table III herebelow.

TABLE I

| Temperature (°C.) | Thermal conductivity (W/m · K) "Strong" direction |
|---|---|
| 100 | 0.075 |
| 200 | 0.075 |
| 300 | 0.080 |
| 400 | 0.090 |
| 500 | 0.10 |
| 600 | 0.11 |
| 700 | 0.13 |
| 800 | 0.14 |
| 900 | 0.16 |
| 1000 | 0.18 |
| 1100 | 0.21 |
| 1200 | 0.24 |
| 1300 | 0.26 |
| 1400 | 0.30 |
| 1500 | 0.34 |
| 1600 | 0.38 |
| 1700 | 0.42 |

TABLE II

| Temperature (°C.) | Thermal conductivity (W/m · K) "Strong" direction | Thermal conductivity (W/m · K) "Weak" direction |
|---|---|---|
| 20 | 0.090 | 0.090 |
| 100 | 0.092 | 0.092 |
| 200 | 0.095 | 0.095 |
| 300 | 0.10 | 0.098 |
| 400 | 0.11 | 0.10 |
| 500 | 0.12 | 0.11 |
| 600 | 0.13 | 0.12 |
| 700 | 0.14 | 0.13 |
| 800 | 0.15 | 0.14 |
| 900 | 0.17 | 0.15 |
| 1000 | 0.18 | 0.17 |
| 1100 | 0.20 | 0.18 |
| 1200 | 0.22 | 0.20 |
| 1300 | 0.24 | 0.22 |
| 1400 | 0.27 | 0.25 |
| 1500 | 0.30 | 0.27 |
| 1600 | 0.33 | 0.30 |
| 1700 | 0.38 | 0.34 |

EXAMPLE 2

Production of the fibrous billet 560 g of alumina based fibers with a mean diameter of 1.4 μm, a mechanical strength of 760 MPa (76 kgf/mm$^2$), a classification temperature of 1650° C. and a composition of 80 weight % of Al$_2$O$_3$ and 20 weight % of SiO$_2$ were provided. These fibers were milled according to the process of Example 1 until an aspect ratio (l/d) of 60 had been obtained. In this example, the fiber concentration was 2.5 volume %.

The billet was also molded as in Example 1, with a gap of 600 mm between the plates in the frame.

Preparation of the binder:

515 g of aluminum nitrate were dissolved in 1535 ml of distilled water. 350 g of colloidal silica solution were added to the solution thus obtained, the procedure being the same as in Example 1. 2400 g of a mixture occupying a volume of 2180 ml were obtained. 220 ml of distilled water were added to the mixture and a binder having an SiO$_2$:Al$_2$O$_3$ weight ratio of 1 was obtained, in an amount equal to the volume occupied by the fibrous billet. The sum of the amounts of the oxides (alumina and silica) in the binder was 140 g, which represented 20 weight % in relation to the weight of the material.

The starting reactants used here were the same as in Example 1.

Production of the semi-finished product:

The fibrous billet was placed, as in Example 1, in a vessel with the binder and in the amount of 2400 ml.

The following operations were carried out as described in Example 1, except that the gelation time was 15 hours in this example.

Firing was carried out at 1450° C. for 1.5 hours.

After machining, the dimensions of the plate were 190×190×55 mm and its density was 270 kg/m$^3$ (0.27 g/cm$^3$).

The material was tested to determine its mechanical strength, its thermal stability (see Table III hereafter) and its thermal conductivity (see Table II hereafter), both in the "weak" direction and in the "strong" direction, in an inert gas atmosphere, at a pressure of 0.1 MPa (1 atm).

EXAMPLE 3

Production of the fibrous billet:

1170 g of fibers having the same properties as in Example 1 were milled until an aspect ratio (l/d) of 40 was obtained. In this example, the fiber concentration was 5 volume %. The procedure was generally the same as in Example 1.

The billet was also molded as in Example 1, the gap between the plates, in the frame, being 60 mm.

Preparation of the binder:

530 g of aluminum nitrate were dissolved in 1580 ml of distilled water. 290 g of colloidal silica solution were added to the solution thus obtained, the procedure being as in Example 1. 2400 g of a mixture occupying a volume of 2260 ml were obtained. 140 g of distilled water were added to this mixture and a binder having an SiO$_2$:Al$_2$O$_3$ weight ratio of 0.8 was obtained in an amount equal to the volume of the fibrous billet, i.e. 2400 cm$^3$ (200×200×60 mm). The reagents used in this example were the same as those of Example 1.

Production of the semi-finished product:

The dried fibrous billet, fixed in a frame, was placed in a vessel (the dimensions of which were 215×215×120 mm) with the binder in an amount equal to 2400 ml. Procedure was then as in Example 1.

Firing was carried out at 1450° C. for 1.5 hours.

After machining, the plate obtained had the following dimensions: 190×190×55 mm, a density of 510 kg/m$^3$ (0.51 g/cm$^3$) and a binder content of 10 weight %.

The results of the tests are set forth in Table III hereafter.

EXAMPLE 4

Production of the fibrous billet:

490 g of fibers having the same properties as in Example 2 were milled until an aspect ratio (l/d) of approximately 90 was obtained. In this example, the fiber concentration in the slurry was 1.5 volume %.

The billet was molded in accordance with the process of Example 1, the gap between the plates, in the frame, being 80 mm.

Preparation of the binder:

290 g of aluminum nitrate were dissolved in 2830 ml of distilled water. 80 g of colloidal SiO$_2$ solution were added to the solution thus obtained. 3200 g of a mixture occupying a volume of 3080 ml were obtained. 120 g of distilled water were added to this mixture and a binder having an $SiO_2:Al_2O_3$ weight ratio of 0.4 was obtained, in an amount equal to the volume of the fibrous billet, i.e. 3200 cm³. The reactants used here were the same as before.

Production of the semi-finished product:

Firing was carried out as in Example 1. After machining, the plate obtained had the following dimensions: 190×190×70 mm, a density of 170 kg/m³ (0.17 g/cm³) and a binder content of 10 weight %.

The results of the tests are given in Table III hereafter.

EXAMPLE 5

Production of the fibrous billet:

500 g of fibers having the same properties as in Example 2 were milled until an aspect ratio (l/d) of 70 was obtained. In this example, the fiber concentration in the slurry was approximately 2 volume %.

Molding was carried out in accordance with the process of Example 1, the gap between the plates, in the frame, being equal to 60 mm.

Preparation of the binder:

715 g of aluminum nitrate were dissolved in 1100 ml of distilled water. 585 g of colloidal $SiO_2$ were added to the resultant solution. 2400 g of a mixture occupying a volume of 2260 ml were thus obtained. 140 g of distilled water were added to the mixture and the desired amount of binder was obtained, wherein the $SiO_2:Al_2O_3$ weight ratio was equal to 1.2. The reactants used, as well as the semi-finished product manufacturing and firing steps were as described in Example 1.

After machining, the plate obtained had the following dimensions: 190×190×55 mm, a density of 250 kg/m³ (0.25 g/cm³) and a binder content of 30 weight %.

RESULTS

The results of the tests are set forth in Table III hereafter.

TABLE III

| Properties | Examples | | | | |
| --- | --- | --- | --- | --- | --- |
| | 1 | 2 | 3 | 4 | 5 |
| Density (g/cm³) | 0.22 | 0.27 | 0.50 | 0.17 | 0.25 |
| Strength (MPa) tensile strength: | | | | | |
| in "weak" direction | 0.42 | 0.43 | >2.53 | 0.20 | 0.54 |
| in "strong" direction | 0.55 | 0.78 | >3.85* | | |
| compression strength: | | | | | |
| in "weak" direction | 0.85 | 1.0 | >9.0** | 0.31 | 0.93 |
| in "strong" direction | 1.06 | 1.42 | >9.0** | — | 1.37 |
| bending strength: | | | | | |
| in "weak" direction | 1.18 | 1.42 | | | 1.90 |
| Linear shrinkage (%) (after 24 hours at 1600° C.) | | | | | |
| in "weak" direction | 1.5 | 1.5 | 0.6 | 1.0 | 4.0 |
| in "strong" direction | 0.8 | 0.8 | 0.0 | 0.0 | 2.0 |
| Coefficient of linear thermal expansion, (1/K × 10⁻⁶) | ≈6 | ≈6 | ≈6 | ≈6 | ≈6 |

*- damage occurred along the plane of bonding of the sample and the metal support;
**- the data were limited by the parameters of the load cell.

We claim:

1. A process for manufacturing a heat insulating material comprising alumina based fibers and aluminosilicate binder, said process comprising the following steps:

a) milling alumina based fibers, having a mean diameter less than or equal to 2 μm, in water until a mean aspect ratio (l/d) of 30 to 130 is obtained;

b) vacuum molding a billet from the resulting aqueous, fibrous, flowing slurry;

c) fixing said billet in a frame, while compressing it slightly;

d) drying said slightly compressed billet in the frame to form a dried billet;

e) preparing an aluminosilicate binder having low durability;

f) impregnating the dried billet, fixed in the frame, with the binder;

g) gelling the binder to produce a semi-finished product;

h) removing the semi-finished product from the frame;

i) drying the semi-finished product; and j) firing the semi-finished product.

2. The process according to claim 1, wherein step a) comprises two phases:

a') pre-milling water wetted fibers in a mold, by mechanical pressing using a punch, until an aspect ratio (l/d) that is 10 to 20% greater than the mean aspect ratio is achieved; and a") milling the fibers in water in a disperser having a propeller mixer with a shifted axis, said milling being carried out until the mean aspect ratio (l/d) is obtained.

3. The process according to claim 1, wherein step e) is carried out immediately prior to impregnation.

4. The process according to claim 1, wherein the binder is essentially formed of an aqueous mixture of colloidal $SiO_2$ having a pH of at least 8, and of one or more non-organic and/or organic aluminum salts.

5. The process according to claim 1, wherein the binder has a $SiO_2:Al_2O_3$ weight ratio ranging from 0.4 to 1.4.

6. The process according to claim 1, wherein step f) is carried out by placing the billet, fixed in a frame between two perforated plates, in a bath containing the binder.

7. The process according to claim 1, wherein step g) is carried out by holding the impregnated billet in air at ambient temperature until a solid is obtained.

8. The process according to claim 1, wherein step i) is carried out at a temperature of not more than 100° C., until a constant weight is obtained.

9. The process according to claim 1, wherein step i) is carried out in air, at a temperature of 1300° to 1600° C., for 1 to 10 hours.

10. The process according to claim 1, wherein the alumina based fibers comprise from 72 to 97 weight % of $Al_2O_3$ and from 3 to 28 weight % of $SiO_2$.

11. The process according to claim 1, wherein the alumina based fibers have a diameter in the range of 0.1 to 5 μm and a length in the range of 5 to 600 μm.

* * * * *

UNITED STATES PATENT AND TRADEMARK OFFICE
CERTIFICATE OF CORRECTION

PATENT NO. : 5,556,586
DATED : September 17, 1996
INVENTOR(S) : Boris V. Shchetanov et al.

It is certified that error appears in the above-indentified patent and that said Letters Patent is hereby corrected as shown below:

Title page, items

[75] Inventors: please delete "U.S.S.R." and insert therefor --Federation of Russia--.

[73] Assignee: please delete "U.S.S.R." and insert therefor --Federation of Russia--.

[56] References cited: please delete "2610923 4/1988 France" and insert therefor --2610923 8/1988 France--.

Column 1, line 40, please delete "pyrolsis" and insert therefor --pyrolysis--.

Column 3, line 27, please delete "composition" and insert therefor --compositions--.

Column 8, line 10, after "axis", please delete --,--.

Column 11, lines 39 through 60, please delete Table III and insert the following corrected Table III:

Signed and Sealed this

Twenty-ninth Day of July, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,556,586

DATED : September 17, 1996

INVENTOR(S) : Boris V. Shchetanov et al.

It is certified that error appears in the above-indentified patent and that said Letters Patent is hereby corrected as shown below:

TABLE III

| Properties | Examples | | | | |
|---|---|---|---|---|---|
| | 1 | 2 | 3 | 4 | 5 |
| Density (g/cm$^3$) | 0.22 | 0.27 | 0.50 | 0.17 | 0.25 |
| Strength (MPa) | | | | | |
|   - tensile strength: | | | | | |
|     in "weak" direction | 0.42 | 0.43 | >2.53 | 0.20 | 0.54 |
|     in "strong" direction | 0.55 | 0.78 | >3.85* | | |
|   - compression strength: | | | | | |
|     in "weak" direction | 0.85 | 1.0 | >9.0** | 0.31 | 0.93 |
|     in "strong" direction | 1.06 | 1.42 | >9.0** | - | 1.37 |
|   - bending strength: | | | | | |
|     in "weak" direction | 1.18 | 1.42 | | | 1.90 |
| Linear shrinkage (%) (after 24 hours at 1600°C) | | | | | |
|     in "weak" direction | 1.5 | 1.5 | 0.6 | 1.0 | 4.0 |
|     in "strong" direction | 0.8 | 0.8 | 0.0 | 0.0 | 2.0 |
| Coefficient of linear thermal expansion, (1/K x 10$^{-6}$) | ≈6 | ≈6 | ≈6 | ≈6 | ≈6 |